Sept. 11, 1962     G. A. LYON     3,053,576
WHEEL COVER
Filed Jan. 4, 1960                                             2 Sheets-Sheet 2
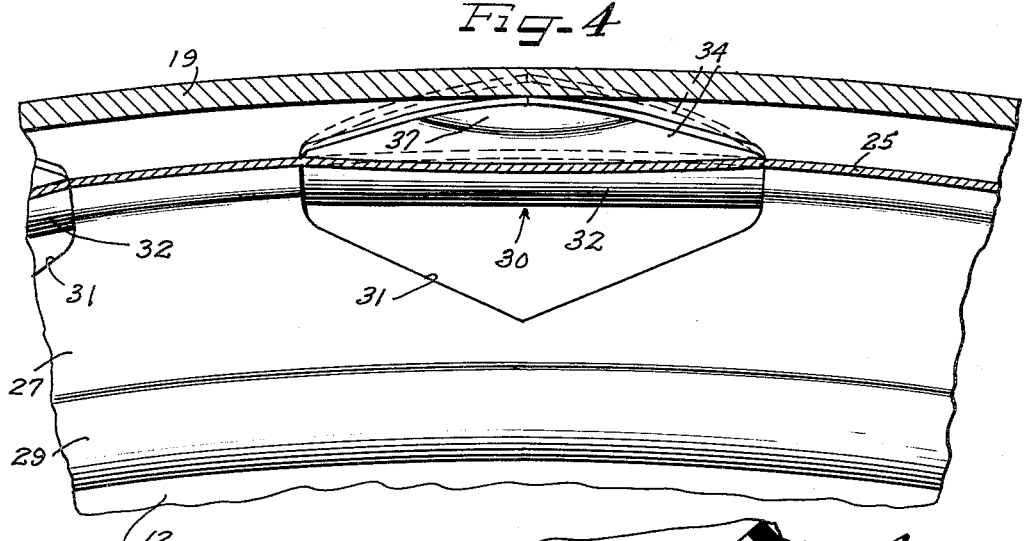
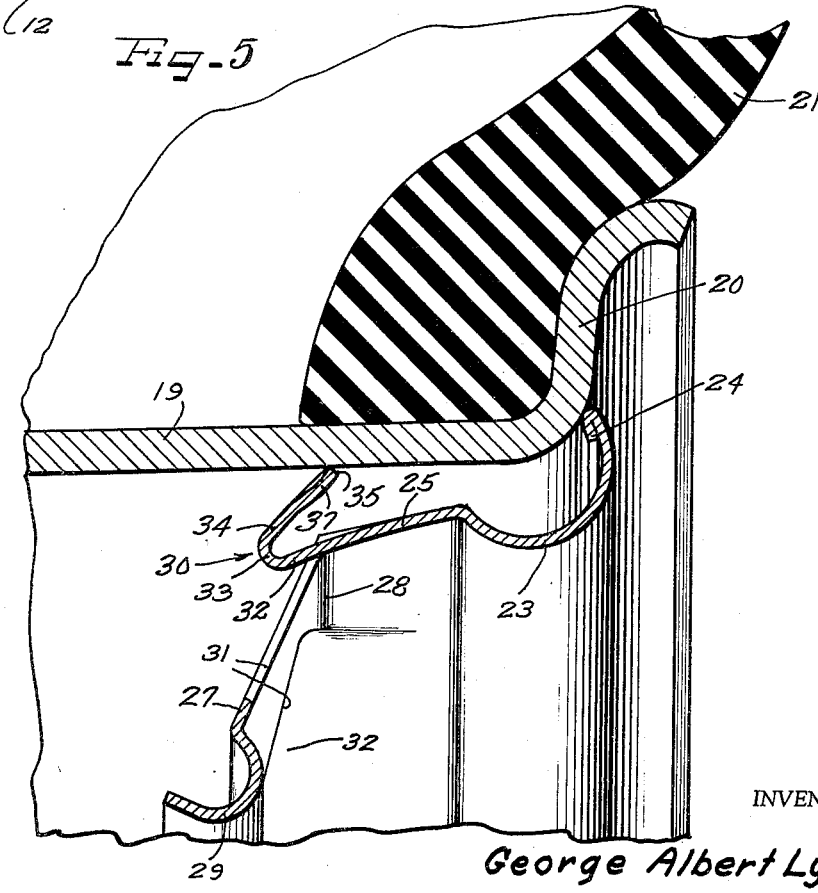
INVENTOR
George Albert Lyon
BY
ATTORNEYS United States Patent Office 3,053,576
Patented Sept. 11, 1962

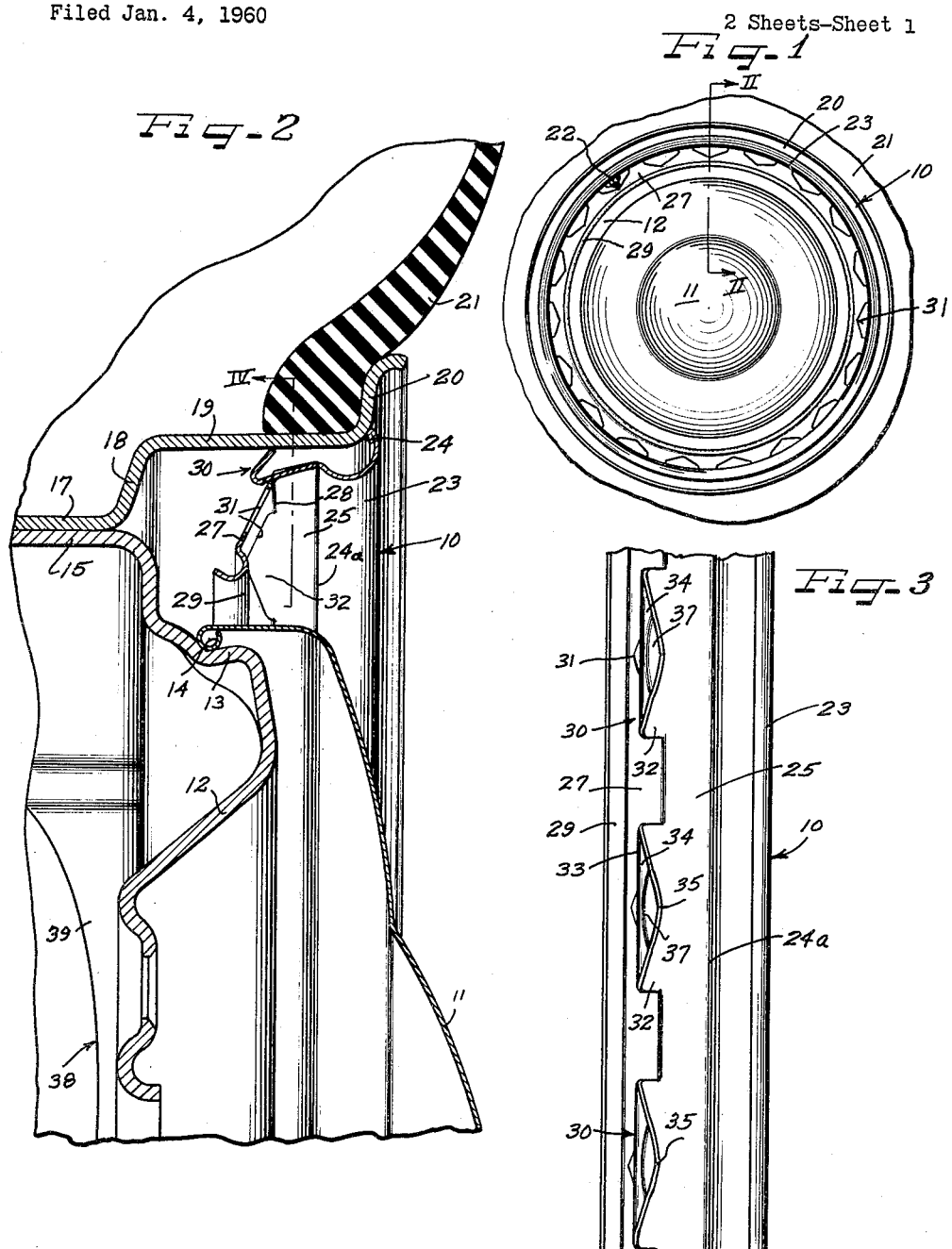

3,053,576
WHEEL COVER
George Albert Lyon, Detroit, Mich., assignor to Lyon Incorporated, Detroit, Mich., a corporation of Delaware
Filed Jan. 4, 1960, Ser. No. 435
1 Claim. (Cl. 301—37)

The present invention relates to improvements in wheel structures and more particularly concerns the ornamental and protective covering of the outer sides of vehicle wheels.

An important consideration in wheel cover members is the provision of adequate retaining means that will withstand rugged surface requirements and which will resist damage from the usual abuses, inept handling and other hazards in the field. More especially, a substantial problem is presented with respect to meeting these requirements where retaining fingers are struck from material of a sheet metal cover member as an integral one-piece part of the cover member in the form of retaining fingers having retaining terminals which engage directly edgewise against a substantially straight flange surface of a wheel.

An important object of the present invention is to provide a wheel cover member having novel cover retaining fingers thereon.

Another object of the invention is to provide a novel wheel cover member having an improved coaction of cover retaining fingers thereon with a resilient tensioning portion of the cover member.

A further object of the invention is to provide an improved wheel structure wherein a cover member of sheet metal has struck out integral retaining fingers having a novel action and coaction with respect to the cover member and the wheel upon which the cover member is mounted.

Still another object of the invention is to provide a cover member having novel retaining finger or clip structure which is unusually well suited for rough usage.

Yet another object of the invention is to provide a novel wheel cover member which can be produced economically and sold at low cost.

Other objects, features and advantages of the present invention will be readily apparent from the following detailed description of a preferred embodiment thereof taken in conjunction with the accompanying drawings, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is an outer edge view of the novel cover member showing the same in developed plan;

FIGURE 4 is an enlarged fragmentary sectional elevational detail view taken substantially on the line IV—IV of FIGURE 2; and FIGURE 5 is a substantially enlarged fragmentary sectional detail view similar to FIGURE 2 but showing the cover member in greater detail so as to bring out certain novel features in association with the wheel.

Referring to FIGURES 1–3, a wheel cover member 10 is shown which is in the form of a protective and ornamental annulus adapted to be used in association with a central hub cap 11 but which may if preferred be in the form of a full disk cover member wherein, in effect, the central hub cap 11 would be a central crown portion of the cover member.

Both the cover member 10 and the hub cap 11 are adapted to be applied in press-on, pry-off relation at the outer side of a more or less standard type of vehicle wheel including a disk spider wheel body 12 having cover retaining protrusions 13 by which a resilient terminal bead 14 of the hub cap 11 is interengaged in press-on, pry-off relation to retain the hub cap on the wheel centered on the wheel body 12 and with the perimeter of the hub cap spaced radially inwardly from the perimeter of the wheel body defined by an axially extending attachment flange 15.

Suitably secured to the attachment flange 15 of the wheel body is a base flange 17 of a multi-flange, drop center tire rim including a generally radially outwardly extending side flange 18 merging into a generally axially outwardly extending intermediate flange 19 terminating in a terminal flange 20. A pneumatic tire 21 is adapted to be supported by the tire rim with a valve stem 22 which projects from the side flange 18 enabling inflation of the tire.

In the annular form shown, the cover ring member 10 is of a diameter to overlie at least a substantial portion of the tire rim and the portion of the wheel body 12 radially outwardly from the perimeter of the hub cap 11. In this form the cover member 10 lends itself well to being rolled from suitable gauge strip metal stock such as stainless steel, brass, aluminum alloy and the like, although if preferred the cover member may be formed as a drawn stamping. As a principal part of the body thereof, the cover annulus 10 has an annular radially and axially outer rib marginal portion 23 having an underturned reinforcing and finishing edge flange 24 providing an outer terminal edge for the cover member of a diameter to oppose the terminal flange 20 at juncture thereof with the intermediate flange 19, and, as shown, engaging the same and thereby determining the axially inward disposition of the cover member 10 on the wheel.

From its outer edge, the annular rib portion 23 of the cover member extends generally radially inwardly and then axially inwardly on an arched contour more or less sickle-fashion, turned generally radially outwardly at its inner extremity but on a diameter which is sufficiently smaller than the diameter to which the outer edge extends to be disposed in the assembly with the wheel in radially inwardly spaced telescoped relation to the axially outer portion of the intermediate flange 19.

Extending generally axially inwardly but sloping radially inwardly from a small radius reinforcing rib juncture 24a with the cover portion 23 is an annular intermediate cover body portion 25 of limited width and joining a generally radially inwardly and slightly axially inwardly sloping inner portion 27 of the cover member on a small radius reinforcing juncture rib 28. The radially inward extent of the cover portion 27 is such as to overlie the radially outer portion of the wheel body 12 and the side flange 18 of the tire rim and the juncture between the wheel body and the tire rim. At its inner extremity, the cover portion 27 is provided with a turned annular reinforcing rib terminus 29. This rib 29 projects generally axially outwardly and affords a more or less bead-like stiff, form retaining reinforcement for the inner margin of the cover annulus coacting with the larger radially outer reinforcing rib portion 23 of the annulus to resist warpage of the cover member during handling and application to and removal from the wheel.

For press-on, pry-off retention of the cover member 10 on the wheel, the intermediate annular cover body flange portion 25 is provided on its axially inner end with a circumferentially spaced annular series of cover retaining clip fingers 30 each of which is formed integrally in one piece therewith and is constructed and arranged to engage retainingly with the wheel by gripping the radially inner face of the tire rim intermediate flange 19. To this end, each of the retaining fingers 30 comprises material derived by striking out from respective openings 31 in the annular cover portion 27. This affords an economical derivation of the material for the retaining fingers 31 entirely within the extremities of the limited width strip from which the cover annulus is made.

Each of the retaining fingers 30 includes a quite short generally axially extending body portion 32 relative to its width and projecting as an extention from and normally in the same plane as the cover body flange 25, including the axial plane as well as the circumferential curvature plane, especially at juncture with the cover body flange. In a preferred arrangement as shown, the relatively great width of the short finger body extensions 32 is substantially greater than the width of the intervening spoke-like portions of the cover portion 27 between the openings 31 and joining the intermediate cover body portion flange 25 on the reinforcing rib juncture 28. In this instance the finger bodies 32 are twice as wide as the adjoining connecting spoke portions.

In the desirable form shown, each of the retaining finger body portions 32 is of substantially uniform width throughout its length whereby to be of substantially uniform resilient stiffness to juncture on a small radius stiffly reinforcing juncture bend rib 33 with a generally return-bent radially and axially outwardly oblique retaining terminal flange 34 of generally isosceles triangular form, quite short in relation to base width and terminating in central gripping point 35. By virtue of the wide base to short length ratio of the retaining terminal flange 34 dimensions and the reinforcing radius juncture rib 33, the terminal flange is stiffly resistant to bending deflection but tends upon pressure being applied radially inwardly on the point or tip 35 to resist deflection and thus transmit such pressure to the short and stiff body 32 which, as shown in FIGURES 2, 4 and 5 transmits the force of the pressure to the generally axial cover body flange 25 which due to its resilience in the portion in line with the flinger resiliently yields to a limited extent resisted at each side of the finger by the intervening spoke portion of the inner cover portion 27 and the reinforcing juncture rib 28.

Additional stiffness in the retaining terminal flange 34 of each of the fingers 30 may be attained by a generally hyperbolic-paraboloidal arcuation 37 of the tip portion of the terminal flange 34 aligned with and inclusive of the point 35. By the generally radially inward warping of the arcuation 37 out of the normal plane of the terminal flange 34 full benefit of reinforcing stiffness of the arcuation is attained without interference with efficient generally biting gripping thrust of the point 35 relative to the opposing wheel flange 19, but actually there is improved orientation of the point radially outwardly to facilitate such engagement. This is shown within the limitations of line drawing in FIGURES 3, 4 and 5. It will be observed that although the arcuations 37 are curved from side-to-side as well as longitudinally of the terminal flanges 34, that the boundaries of the arcuations 37 in the portions thereof remote from the respective tips 35 are short of the respective bend ribs 33 and that such boundaries angle away from the bend ribs to the respective converging sides of the terminal flange 34.

Normally the tip extremity points 35 project to a diameter which is slightly greater than the diameter of the opposing portion of the inner face of the wheel rim flange 19 as indicated in dash outline in FIGURE 4. Then, after the cover has been centered on the wheel and with one of the openings 31 in registration with the valve stem 22 as shown in FIGURE 1, axially inward pressure against the outer annular cover body portion 23 causes the retaining extremity points 35 of the fingers to cam inwardly along the tire rim flange face, with the fingers 30 being uniformly flexed radially inwardly by resilient flexible yielding of primarily the portions of the intermediate cover flange 35 in line with the fingers, substantially as shown in full outline in FIGURE 4 and in FIGURES 2 and 5. This affords a high degree of resilient tension for the stiff fingers and causes the points 35 to dig or bite into the opposing rim flange surface and especially the usual paint with which such surface is covered. Although the tensioned thrust with which the fingers 30 are biased into the gripping engagement with the rim flange results in a quite thorough retaining interengagement, pry-off can be readily effected with a pry-off tool such as a screwdriver or the like applied behind the fairly stiff reinforced outer edge of the cover to thereby slidably disengage the retaining finger points 35. Since the terminal flanges 34 are substantially rigid and the juncture rib 33 affords additional reinforcement there is a very high reresistance to damaging deformation of the retaining fingers during pry-off, or, for that matter, to abusive handling. There is enough resilient tolerance in the aligned portions of the cover body flange 25 to permit the slight additional radial flexing toward the diametrically opposite side of the cover from the point of application of pry-off force to ease release of the retaining finger points 35 nearest the point of pry-off tool force.

For air circulation the openings 31 in the cover member 10 are well located generally opposite conventional openings 38 in the wheel provided by radially inwardly offset portions 39 of the wheel body flange 15 (FIG. 2).

It will be understood that modifications and variations may be effected without departing from the scope of the novel concepts of the present invention.

I claim as my invention:

In a wheel structure including a wheel part having an annular generally radially facing wheel flange, a cover member for disposition in press-on, pry-off relation over the outer side of the wheel, said cover member having a circumferential series of cover retaining fingers including generally isosceles triangular terminal flange portions projecting obliquely from the adjacent cover member portion and joined thereto on respective small radius stiffly reinforcing juncture bend ribs, with points toward which the respective sides of the terminal flange portions converge engageable in generally biting gripping thrust with the radially facing flange of the wheel part, said terminal portions having reinforcing arcuations aligned with and inclusive of the points thereof, such arcuations being warped out of the normal plane of the terminal flange portions toward said adjacent cover member portion and away from said wheel part flange whereby to effect an improved orientation of the points toward said wheel part flange, the boundaries of the arcuations in the portion thereof remote from the points being disposed short of the respective bend ribs and angling away from the bend rib in each instance to the respective converging sides of the terminal flange portion.

References Cited in the file of this patent

UNITED STATES PATENTS

| | | |
|---|---|---|
| Re. 22,428 | Lyon | Feb. 1, 1944 |
| 1,675,277 | Roe | June 26, 1928 |
| 2,368,238 | Lyon | Jan. 30, 1945 |
| 2,596,940 | Poupitch | May 13, 1952 |
| 2,616,733 | Strange | Nov. 4, 1952 |
| 2,772,924 | Landell | Dec. 4, 1956 |
| 2,826,458 | Lyon | Mar. 11, 1958 |